(12) United States Patent
Nelson

(10) Patent No.: US 7,004,219 B2
(45) Date of Patent: Feb. 28, 2006

(54) ROLLER FOR AUTOMATED FABRIC LAYUP

(75) Inventor: W. Robert Nelson, Wichita, KS (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 10/269,675

(22) Filed: Oct. 11, 2002

(65) Prior Publication Data

US 2004/0069413 A1   Apr. 15, 2004

(51) Int. Cl.
*B32B 31/00* (2006.01)
*B32B 31/20* (2006.01)

(52) U.S. Cl. .............. 156/538; 156/539; 156/574; 156/580; 492/27; 492/28

(58) Field of Classification Search ............... 156/538, 156/539, 574, 543, 433, 435, 436, 445, 446, 156/458, 184, 196, 199, 556, 580; 492/16, 492/27, 28

See application file for complete search history.

(56) References Cited

U.S. PATENT DOCUMENTS

| | | | | |
|---|---|---|---|---|
| 3,874,030 A | * | 4/1975 | Knight | 28/282 |
| 4,461,669 A | * | 7/1984 | Dontscheff | 156/574 |
| 4,601,775 A | * | 7/1986 | Grone | 156/523 |
| 4,870,731 A | * | 10/1989 | Yano | 492/16 |
| 5,015,326 A | * | 5/1991 | Frank | 156/511 |
| 5,074,948 A | * | 12/1991 | Greffioz et al. | 156/361 |
| 6,145,174 A | * | 11/2000 | Podlesny et al. | 26/99 |
| 6,343,639 B1 | * | 2/2002 | Kaye et al. | 156/539 |

* cited by examiner

*Primary Examiner*—Sue A. Purvis
(74) *Attorney, Agent, or Firm*—Thomas E. Donahue; Artz & Artz, P.C.

(57) ABSTRACT

An apparatus for automated fabric lay-up of composite laminates 10 is provided, including an automatic dispensing assembly 12 dispensing pre-preg fabric 14 in a dispensing direction 30. The apparatus 10 further includes a roller element 38 having a contact surface 40 in communication with the pre-preg fabric 14. The roller element 38 rotates such that the contact surface 40 induces lateral tension in the pre-preg fabric 14 over which it rolls such that wrinkles are removed.

7 Claims, 3 Drawing Sheets

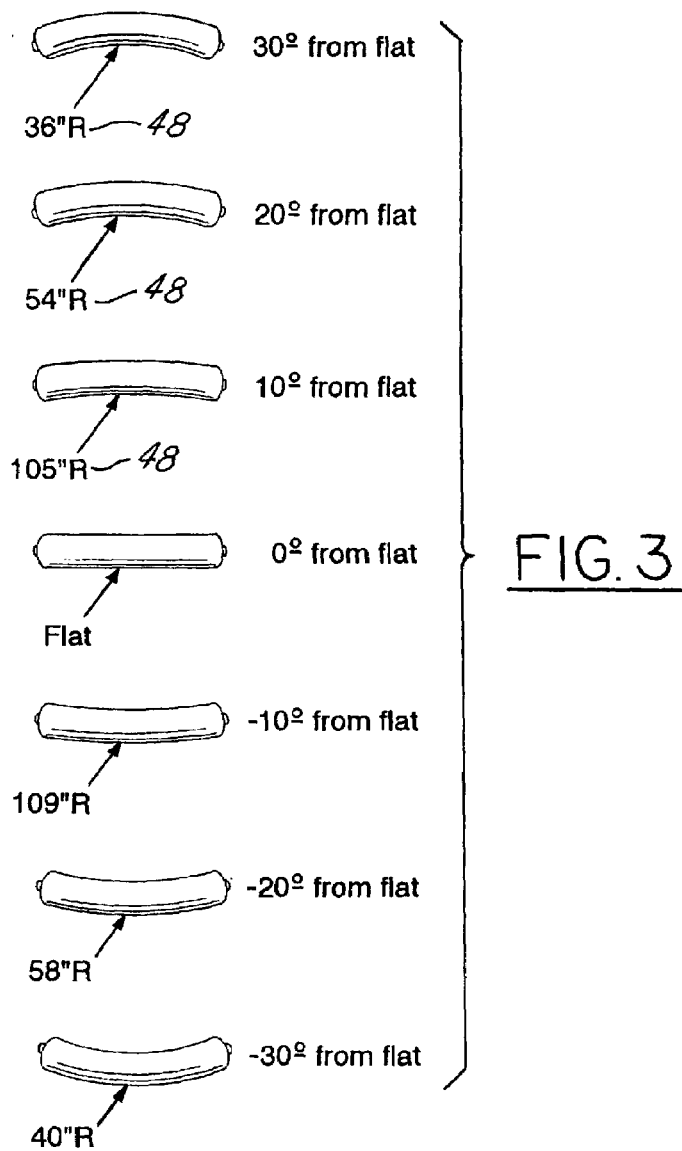
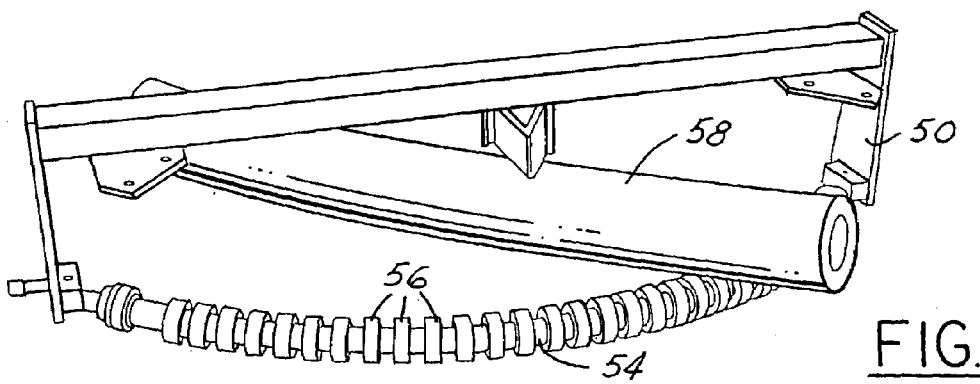
FIG. 3
FIG. 4

ROLLER FOR AUTOMATED FABRIC LAYUP

TECHNICAL FIELD

The present invention relates generally to an apparatus and method for automated fabric lay-up of aerospace composite laminates and more specifically to an apparatus and method for automated fabric lay-up of aerospace composite laminates with wrinkle reduction.

BACKGROUND OF THE INVENTION

Aerospace laminates are widely used throughout the aerospace industry. They provide high strength and low weight structures that are responsible for increased efficiency, reduced costs, improved performance, and broadened applications within the aerospace field. Although aerospace laminates are widely utilized and are credited with a wide variety of benefits and savings when applied to aerospace structures, they often present undesirable characteristics when implemented by modern practices.

Aerospace laminates are traditionally fabricated through the application of a plurality of pre-impregnated plies, such as fabric plies, to a tool surface. Commonly these plies, also known as prepreg, are manually positioned and applied to the tool surface in order to insure the individual layers are applied in a wrinkle free manner. The process of manually positioning and applying these layers is commonly referred to as "hand lay-up". The hand lay-up process can be labor intensive. Additionally, the manual nature of the process can result in variability of the resultant structure which is highly undesirable. Finally, hand lay-up processes are often impractical when applied to large-scale structures. Large scale structures can present ergonomic problems for lay-up technicians. All of these concerns developed from the hand lay-up process are known to negatively impact the labor costs of the resultant structure. Labor can account for more than half the cost of such composite structures.

A solution that eliminates the negative cost and efficiency associate with hand lay-up is to automate the process. Several existing processes are known wherein composite materials can be laid down by automated means. These include fiber tow placement, filament winding, and tape laying. Although these approaches provide limited functionality, they are often found to be undesirably limited in the width of material that they can apply. In addition, often these approaches are compatible only with unidirectional fiber and not woven fabric. Since fabric can have significant advantages over unidirectional composites in many applications, hand lay-up has remained common in spite of the known and existing automated composite fabrication processes in use today.

It would therefore be highly desirable to have an apparatus and method for automated fabric lay-up of aerospace composite laminate that took advantage of the benefits of woven fabric composites. It would further be highly desirable to develop an apparatus and method for automated fabric lay-up of aerospace composite laminate that eliminated the labor-intensive hand lay-up process that has often been necessitated by fabric use.

SUMMARY OF THE INVENTION

It is therefore an object to the present invention to provide an apparatus for automated fabric lay-up of aerospace composite laminates. It is further object to the present invention to provide an apparatus for automated fabric lay-up of aerospace composite laminates that utilized woven fabric composites.

In accordance with the objects of the present invention an apparatus for automated fabric lay-up of composite laminates is provided. The apparatus includes an automatic dispensing assembly dispensing pre-preg in a dispensing direction. The apparatus further includes a roller element having a contact surface in communication with the pre-preg. The roller element rotating such that the contact surface induces lateral tension in the pre-preg over which it rolls such that wrinkles are removed from the pre-preg.

Other objects and features of the present invention will become apparent when viewed in light of the detailed description and preferred embodiment when taken in conjunction with the attached drawings and claims.

BRIEF DESCRIPTION OF THE DRAWINGS

FIG. 3 is a plurality of front details of the roller element illustrated in FIG. 2, the detail illustrating a sample of the range of adjustment of the roller element;

FIG. 4 is a break-out detail of the roller element illustrated in FIGS. 1–3, the detail illustrating the components of the roller element;

DESCRIPTION OF PREFERRED EMBODIMENTS

Figure 1:
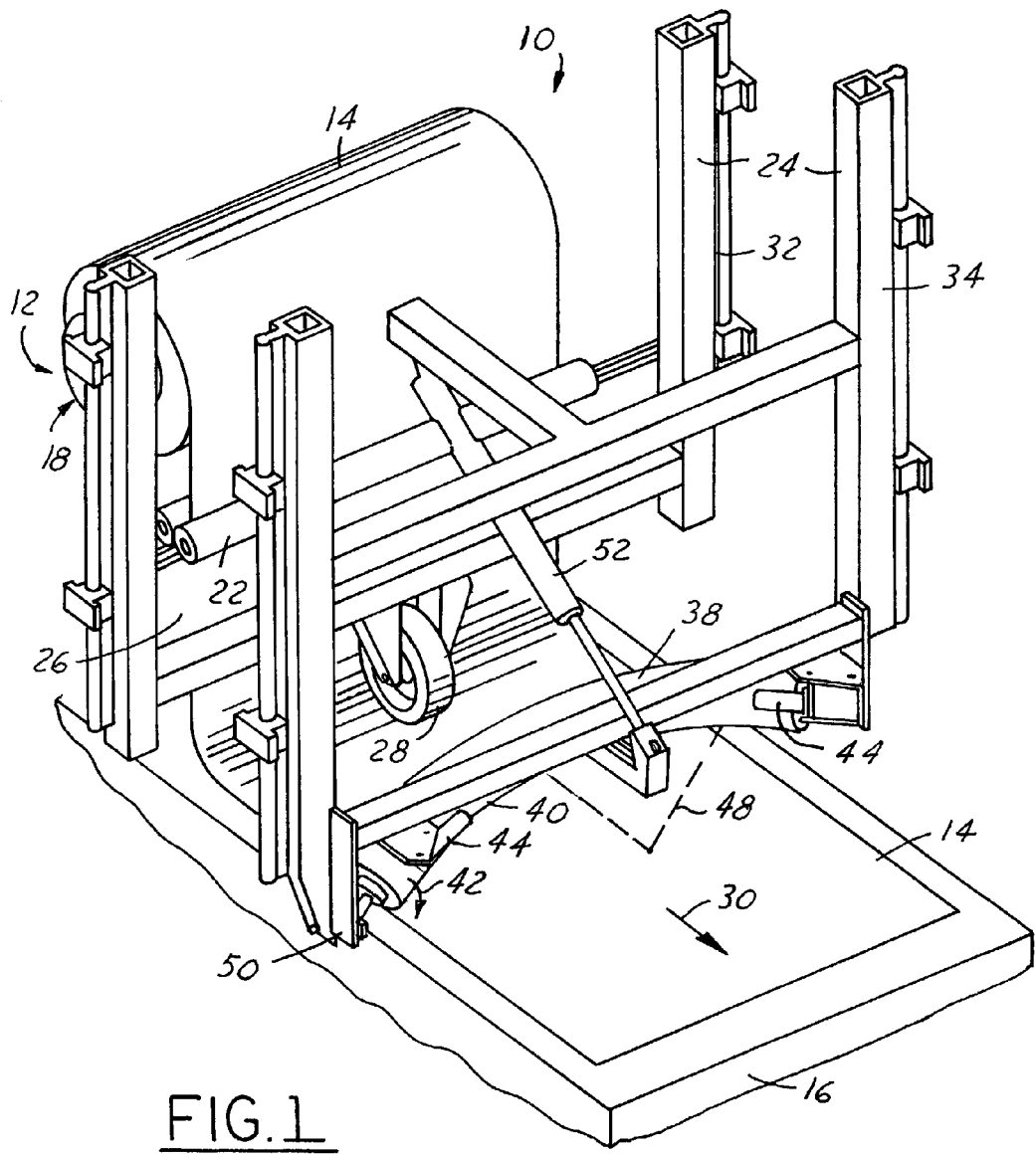
FIG. 1 is an illustration of an apparatus for automated fabric lay-up of composite laminates in accordance with the present invention.
Figure 2:
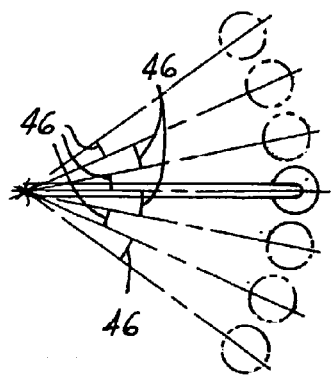
FIG. 2 is a side-view detail of the roller element for use in the apparatus for automated fabric lay-up of composite laminates shown in FIG. 1, the detail illustrating the adjustability of the roller element.

Referring now to FIG. 1, which is an illustration of an apparatus for automated fabric lay-up of composite laminates 10 in accordance with the present invention. The apparatus for automated fabric lay-up 10 includes a dispensing assembly 12 housing a roll of pre-impregnated fabric 14 (pre-preg) onto a tool 16 sufrace. It is contemplated that the dispensing assembly 12 can be composed of a variety of independent elements capable of feeding, cutting, and aligning the pre-preg 14 as necessary. Illustrated in FIG. 1 is a feeding assembly 18 including a roller 20 holding the pre-preg 14 (see FIG. 5), an pair of alignment rollers 22 mounted to the main frame structure 24, a cutting element 26, and a drive roller 28 also rotatably affixed to the main fame structure 24. Although several elements of a dispensing assembly have been described, it should be understood that a wide variety of modifications and alternate embodiment may be conceived.

Although a variety of approaches are conceived for dispensing the pre-preg 14 onto the tool 16, one embodiment contemplates movement of the main frame structure 24 over the tool 16. The pre-preg 14 is pressed onto the tool 16 using the drive roller 28 and thus the pre-preg 14 moves onto the tool 16 in a relative dispensing direction 30. A similar approach can be achieved through the movement of the tool 16 under the main frame structure 24. Alternate embodiments contemplate the use of a variety of dispensing structures. Although a single main frame structure 24 can be utilized, the present invention contemplates the use of a main frame structure 24 including a rear frame structure 32 and a forward frame structure 34. The rear frame structure is intended to accommodate the dispensing assembly 12 while the forward frame structure 34 is intended to accommodate a roller assembly 36.

The roller assembly 36 can include a variety of elements, most importantly a roller element 38. The roller element 38 includes a contact surface 40 (or edge) in direct contact with the pre-preg 14. The roller element 38 is rotated as the pre-preg 14 is dispensed such that lateral tension is induced in the pre-preg 14. Although such lateral tension may be induced through rotation in either direction, it has been found that it is preferably for the roller element 38 to rotate such that the contact surface 40 moves in a roller direction 42 counter to the relative dispensing direction 30 (see also FIG. 5). It is further contemplated that the roller assembly 36 can include at least one rotational drive assembly 44 for powering the roller element 38 and effectuating its rotation counter to the relative dispensing direction 30.

Although it is contemplated that the roller element 38 may be formed in a variety of ways so as to induce lateral tension in the pre-preg 14, in one embodiment it is contemplated to induce lateral tension through the utilization of a bowed roller element 38. Since the roller element 38 applies force to the pre-preg 14 in a direction normal to its curvature at every location along its length, the net effect is to induce tension in the pre-preg 14 across its width, ensuring an absence of wrinkles. Although the bowed roller element 38 may function when orientated in either direction, it is preferably orientated such that it is bowed towards the relative dispensing direction 30. The use of a bowed roller element 38 is also intended to provide additional benefits to the present invention. It is conceived that the bowed roller element 38 may be angled 46 relative towards the dispensing direction 30 such that the roller curvature 48 (see FIG. 3) best approximates the local tool 16 contour. By angling the bowed roller element 38 a variety of contours can be accommodated as is clearly illustrated by the frontal view details of the roller element 38 shown in a variety of angles 46 in FIG. 3.

Although it is contemplated the bowed roller element 38 may be angled 46 in a variety of methods or actuators, one embodiment contemplates the use of a roller substructure 50 rotatably attached to the main frame structure 24. The roller element 38 is affixed to the roller substructure 50 such that the roller element 38 becomes angled as the roller substructure 50 rotates relative to the main frame structure 24. Although the present invention could be utilized such that the roller element 38 is manually calibrated to match the tool 16 contour, it is far more practical for the roller assembly 36 to further include a tensioner element 52 in communication between the roller substructure 50 and the main frame structure 24 such that the roller substructure 50 naturally rotates such that the roller element 38 adapts to the localized contour of the tool 16 as the pre-preg 14 is dispensed. Although a variety of tensioner elements 52 are contemplated, FIG. 1 illustrates the use of a hydraulic tensioner element 52.

An exploded detail of an embodiment of the roller assembly 36 is illustrated in FIG. 4. The detail clearly illustrates the roller substructure 50 as well as a detailed embodiment of the roller element 38. Although its is contemplated that the roller element 38 may be formed in a variety of fashions, one embodiment contemplates the use of a rigid bowed spine 54 including a plurality of roller bearings 56. A flexible roller shell 58 is positioned around the rigid bowed spine 54. In order to account for any minor mismatch between the actual tool 16 geometry and the nearest roller element angle 46, the flexible roller shell 58 is preferably made from a conforming material. The rigid bowed spine 54 may also be formed in a variety of radii, although for purposes of example a rigid bow spine 54 with a neutral radius of 22" was found suitable for a roller element 38 designed for a 24" pre-preg width.

Figure 5:
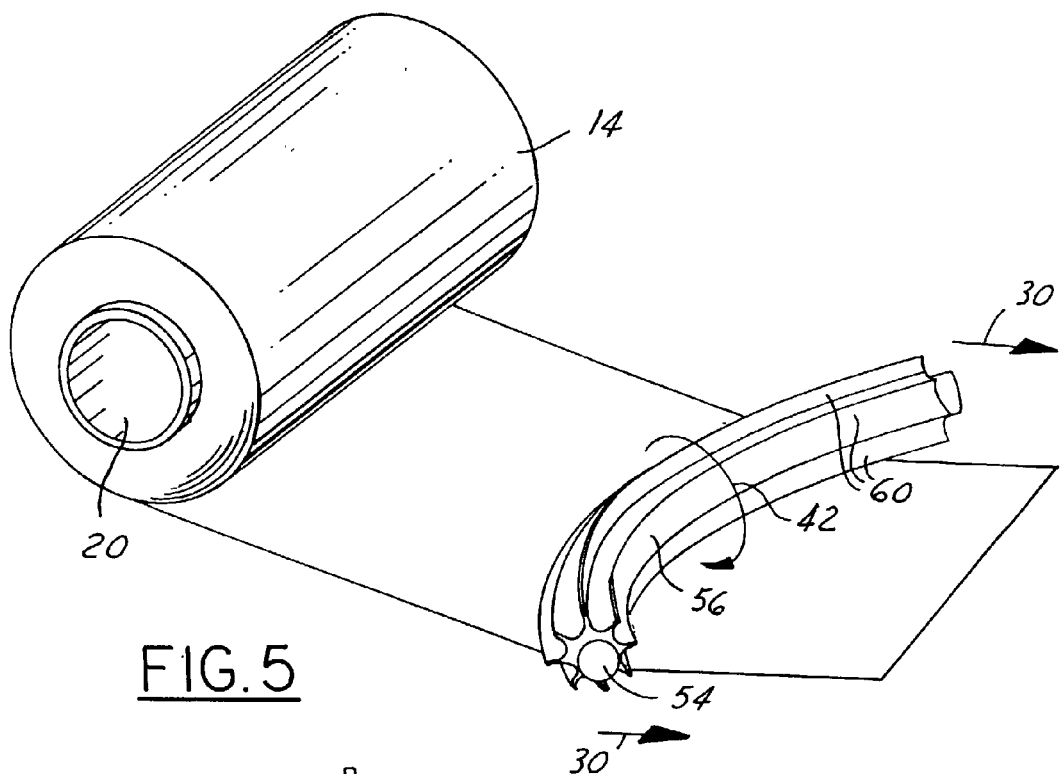
FIG. 5 is an illustration of an alternate embodiment of an apparatus for automated fabric lay-up of composite laminates in accordance with the present invention, the illustration simplified to illustrate an alternate roller cover design.
Figure 6:
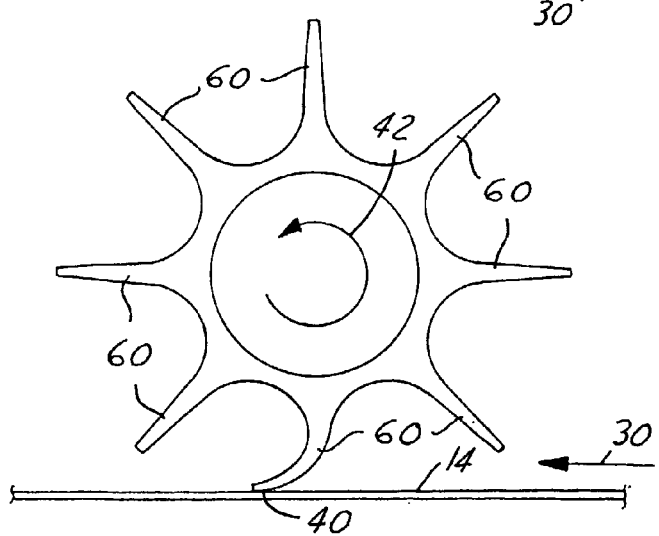
FIG. 6 is a detailed illustration of the alternate roller cover design illustrated in FIG. 5.

Although the apparatus for automated fabric lay-up 10 has thus far been described with relative specificity, it should be understood that a wide variety of modifications and alterations may be implemented without modifying the scope of the present invention. An example of one alternate embodiment is illustrated in FIGS. 5 and 6. In this embodiment, the roller element 38, or more specifically the flexible roller shell 58 if utilized, may include a plurality of flexible blades 60 making contact with the pre-preg 14 as the roller element 38 rotates against it. In this fashion the contact surface 40 area can be reduced to enable better control of the roller element 38 traction. The use of the plurality of flexible blades 60 further allows a greater percentage of the force generated by the roller element 38 to be transferred into the desirable lateral tension force while reducing the amount of force lost to frictional losses between the roller element 38 and pre-preg 14.

Figure 7:
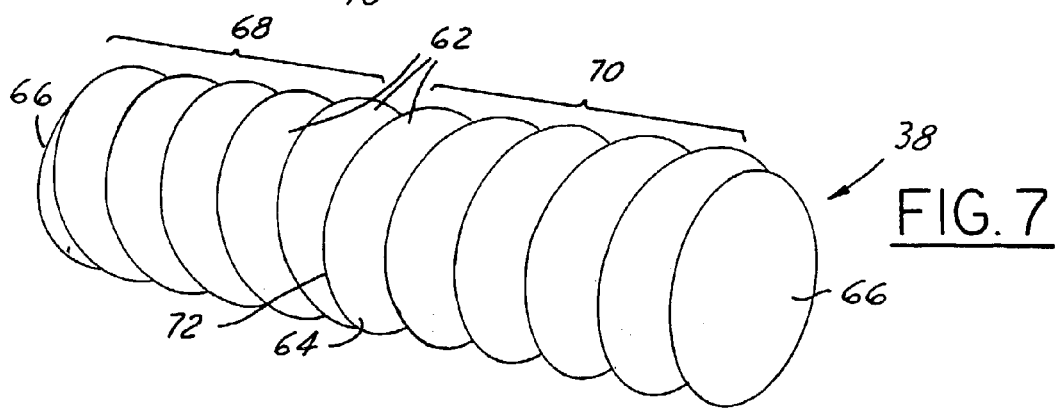
FIG. 7 is a detail illustration of an additional alternate roller cover as contemplated for use with the apparatus for automated fabric lay-up of composite laminates illustrated in FIG. 1.

In still another embodiment illustrated in FIG. 7 the roller assembly 36 can include a straight roller element 38. The roller element 38 includes screw threads 62 incorporated into the outer roller surface 64 such that the pre-preg 14 is driven outwards to the roller ends 66 as the roller element 38 is rotated. Although this may be accomplished through a variety of fashions, one embodiment contemplates forming the roller element 38 out of a conforming material having a right-orientated screw threads 68 formed on one half of the roller element 68 and left-orientated screw threads 70 on the other half. In this fashion the pre-preg material to be pushed away from the center 72 of the roller element 38 towards the ends 66 and thusly induce the desired lateral tension force required for the reduction of wrinkles. The use of the present invention in all the aforementioned variations and embodiments allows the automated application of pre-preg material 14 to a tool 16 with a variety of surfaces, include male and female contours, while reducing or eliminating the production of wrinkles in fabric.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An apparatus for automatic lay-up of a pre-preg fabric onto a tool comprising:

an automatic dispensing assembly mounted on a main frame structure, said automatic dispensing assembly dispensing the pre-preg fabric onto the tool in a relative dispensing direction; a bowed roller element having a contact surface in communication with the pre-preg fabric, said bowed roller element fixedly bowed along its centerline, said bowed roller element capable of being pivoted around its endpoints through a plurality of angles so as to adjust to contours of the tool; and at least one rotational drive assembly in direct communication with said bowed roller element, said at least one rotational drive assembly inducing rotation in said bowed roller element such that said contact surface induces lateral tension in the pre-preg fabric as it is applied to the tool such that wrinkles are removed.

2. An apparatus as described in claim 1, wherein said bowed roller element rotates in a direction such that said contact surface moves in a roller direction counter to said relative dispensing direction.

3. An apparatus as described in claim 1, wherein said bowed roller element is bowed towards said relative dispensing direction.

4. An apparatus as described in claim 1, wherein said bowed roller element includes a plurality of flexible blades formed on an outer roller surface.

5. An apparatus as described in claim 1, wherein said bowed roller element further comprises:

a bowed rigid spine including a plurality of roller bearings; and a flexible roller shell surrounding said bowed rigid spine and rotatable around said plurality of roller bearings, said flexible roller shell comprised of conforming material.

6. An apparatus as described in claim 1, further comprising:

a roller substructure rotatably attached to said main frame structure, said bowed roller element affixed to said roller substructure such that said bowed roller element pivots through said plurality of angles as said roller substructure rotates relative to said main frame structure said bowed roller element movable to a variety of effective engagement radius' in response to said bowed roller element being pivoted through said plurality of angles; and a tensioner element in communication between said roller substructure and said main frame element such that said contact surface presses the pre-preg fabric against the tool.

7. An apparatus as described in claim 1, wherein said bowed roller element comprises a generally constant cross-section along said rotational centerline.

* * * * *